United States Patent [19]

Takemura et al.

[11] Patent Number: 5,254,396
[45] Date of Patent: Oct. 19, 1993

[54] CARBON FIBER STRUCTURE AND PROCESS FOR PRODUCING THE SAME

[75] Inventors: Tetsuji Takemura; Akio Takamatsu; Yoshiyuki Nishimura, all of Kamisu, Japan

[73] Assignee: Petoca Ltd., Tokyo, Japan

[21] Appl. No.: 652,955

[22] Filed: Jan. 25, 1991

[30] Foreign Application Priority Data

Jan. 26, 1990 [JP] Japan .................................. 2-15063

[51] Int. Cl.$^5$ .................... D01F 9/145; C04B 35/52
[52] U.S. Cl. .................................... 428/225; 427/249; 427/113; 427/248.1; 427/255.2; 423/447.4; 423/447.7; 423/447.8; 28/104; 28/107; 428/227; 428/244; 428/259; 428/280
[58] Field of Search ............... 428/244, 225, 227, 259, 428/280; 161/72, 80; 156/72

[56] References Cited

U.S. PATENT DOCUMENTS 3,769,144 10/1973 Economy et al. .................... 161/50
3,903,220 9/1975 Economy et al. .................... 264/29

FOREIGN PATENT DOCUMENTS 0330181 8/1989 European Pat. Off. .
53-52734 5/1978 Japan .
55-7538 1/1980 Japan .
60-167929 8/1985 Japan .
61-132629 6/1986 Japan .
62-152534 7/1987 Japan .
62-289618 12/1987 Japan .

*Primary Examiner*—Patrick J. Ryan
*Assistant Examiner*—Richard C. Weisberger

[57] ABSTRACT

An infusiblized, or infusiblized and slightly carbonized fiber of optically anisotropic pitch type is combined with a phenolic resin fiber to produce a high bulk density carbon fiber structure in the form of a laminate of mutually entangled carbon fiber sheets with improved handleability of fiber sheets and improved stability of a laminate structure formed through entanglement. A high flexural strength carbon-carbon composite material with a high volume fiber content is produced by impregnation with a precursor of carbon and subsequent carbonization of the carbon fiber structure of the kind as described above or a fiber laminate of mutually entangled sheets of the infusiblized, or infusiblized and slightly carbonized fiber of optically anisotropic pitch type blended with the phenolic resin fiber.

6 Claims, No Drawings

CARBON FIBER STRUCTURE AND PROCESS FOR PRODUCING THE SAME

BACKGROUND OF THE INVENTION

1. Field of the Invention

The present invention relates to a high bulk density carbon fiber structure comprising a carbon fiber of optically anisotropic pitch as the main component, and to a process for producing the same.

More particularly, the present invention relates to a high bulk density carbon fiber structure and a process for producing the same, in which utilization of the large elongation and shrinkage of a phenolic resin fiber in combination with an optically anisotropic pitch fiber produces a carbon fiber structure comprising a carbon fiber of optically anisotropic pitch as the main component and increased in bulk density, while improving the handleability of sheets of the phenolic resin fiber and the pitch fiber, which may be either blended with each other in sheets or constitute respective sheets, as well as stabilizing a laminate structure of the sheets formed through entanglement thereof.

2. Prior Art

Carbon fiber structures have heretofore been produced by mutual superposition and adhesion of necessary pieces of a carbon fiber sheet material in a thinly and flatly spread form of fiber, such as a mat, a paper-like material, a non-woven fabric, a woven fabric, or a knitted fabric.

The kind of adhesive used in the production of such a carbon fiber structure greatly differs from one use application of the structure to another. For example, where the carbon fiber structure is used together with a plastic material to form a composite material, a choice is made of an adhesive having a good affinity for the plastic material and is occasionally having to be made of an adhesive which is substantially the same resin as the plastic material. Where the carbon fiber structure is used together with a metallic material to form a composite material, a choice is often desired to be made of an adhesive which is decomposed into vaporizable matter during the course of production of the composite material.

Where the carbon fiber structure is used together with a carbon material to form a composite material, a choice is desired to be made of an adhesive high in yield of carbon in carbonization thereof and capable of forming a high strength carbon material.

Carbon fibers have recently been increasingly evaluated as fibers for use in industrial materials. With an eye to such use of carbon fibers, there has been an increasing demand for a carbon fiber structure free of foreign matter and contaminants.

Taking as one example of industrial materials heat-insulating materials to be used at high temperatures, fibrous materials have heretofore been frequently used as such heat-insulating materials, while foamed materials have not so often been used. In the case of porous ceramic materials to be used as heat-insulating materials at high temperatures, the presence of any pores confined inside the materials entails a danger of explosive destruction of the materials when the internal pressure of the pores varies in keeping with a temperature change. Accordingly, open-cell porous ceramic materials as well as fibrous ones are evaluated to be better.

Under conditions necessitating a highly heat-resistant material, a high level of heat resistance inherent in carbon is highly evaluated. Since processed carbon materials which have heretofore been used as heat-insulating materials are mostly produced from natural materials as starting materials, however, they involve inherent problems, including contamination of themselves and surroundings with impurities derived from the natural materials.

The use of a carbon fiber high in purity of carbon may naturally be considered an effective solution to the problem of contamination. When an adhesive is used in the course of production of a processed carbon material in the form of a carbon fiber structure, however, the adhesive becomes a source of contaminants in most cases.

When an adhesive capable of complete decomposition upon heating is used to produce a processed carbon material in the form of a carbon fiber structure, the decomposition of the adhesive causes destruction of the processed carbon material.

An effective means as a solution to the foregoing problems may involve elimination of adhesives. From such considerations, interfiber entanglement has heretofore been a solution to the same problems with organic fibers.

Carbon fibers of optically anisotropic pitch type are very useful by virtue of their high strengths and high moduli of elasticity. However, they involve an essential difficulty in interfiber entanglement through needling or the like because of their small elongations and linear fiber morphology.

An object of the present invention is to provide a solution to such problems with production of a carbon fiber structure of optically anisotropic pitch that entanglement of a carbon fiber of optically anisotropic pitch through needling or the like is liable to be ineffective because of its comparatively poor twisting, bending and crimping properties, unlike those of common organic fibers, as well as because of its substantially circular cross section; and that the entanglement cannot go on smoothly because the carbon fiber of optically anisotromic pitch is liable to break sooner than move during the course of entanglement because of its very small elongation.

Another object of the present invention is to provide a carbon fiber structure of optically anisotropic pitch type which can be produced without the foregoing problems with the production thereof being involved and is increased in bulk density.

SUMMARY OF THE INVENTION

As a result of intensive investigations on the foregoing problems, the authors of the present invention have found out that mutual superposition and entanglement of sheets of an infusiblized, or infusiblized and slightly carbonized fiber of optically anisotropic pitch together with sheets constituted of the abovementioned fiber and a phenolic resin fiber enables a high bulk density carbon fiber structure to be easily produced with very good handleability of the sheets while stabilizing the laminate structure of the sheets. The present invention has been completed based on such findings.

More specifically, in accordance with a processing-related aspect of the present invention, there is provided (1) a process for producing a high bulk density carbon fiber structure, comprising the step of piling up sheets of an infusiblized, or infusiblized and slightly carbonized fiber of optically anisotropic pitch blended with a phenolic resin fiber, the step of entangling the piled-up sheets with each other to form a fiber laminate, and the step of carbonizing the fiber laminate.

In accordance with the same aspect of the present invention, there also is provided (2) a process for producing a high bulk density carbon fiber structure, comprising the step of piling up one or more sheets of an infusiblized, or infusiblized and slightly carbonized fiber of optically anisotropic pitch together with one or more sheets of a phenolic resin fiber either alone or blended with an infusiblized, or infusiblized and slightly carbonized fiber of optically anisotropic pitch, the step of entangling the piled-up sheets with each other to form a fiber laminate, and the step of carbonizing the fiber laminate.

In accordance with the same aspect of the present invention, there is further provided (3) a process for producing a carbon-carbon composite material with a high volume fiber content, comprising the step of piling up sheets of an infusiblized, or infusiblized and slightly pre-carbonized fiber of optically anisotropic pitch type blended with a phenolic resin fiber, the step of entangling the piled-up sheets with each other to form a fiber laminate, the step of impregnating the fiber laminate with a precursor of carbon, and the step of carbonizing the impregnated fiber laminate.

In accordance with a product-related aspect of the present invention, there is provided (4) a high bulk density carbon fiber structure comprising mutually tightly laminated and entangled sheets of a carbon fiber of optically anisotropic pitch blended with a carbon fiber of phenolic resin.

In accordance with the same aspect of the present invention, there also is provided (5) a high bulk density carbon fiber structure comprising one or more sheets of a carbon fiber of optically anisotropic pitch and one or more sheets of a carbon fiber of phenolic resin either alone or blended with a carbon fiber of optically anisotropic pitch, wherein all the sheets are mutually tightly laminated and entangled.

In accordance with the same aspect of the present invention, there is further provided (6) a high flexural strength carbon-carbon composite material with a high volume fiber content, comprising a fiber laminate of mutually laminated and entangled sheets wherein a carbon fiber of optically anisotropic pitch is combined with a carbon fiber of phenolic resin, and wherein the fiber laminate is in a state of impregnation with carbon in the form of a matrix.

DETAILED DESCRIPTION

The present invention will now be described in more detail.

The infusiblized, or infusiblized and slightly carbonized fiber of optically anisotropic pitch type to be used in the present invention may be produced through a customary infusiblization treatment or customary infusiblization and slight carbonization treatments of a pitch fiber melt-spun from petroleum, coal or like pitch either comprising optically anisotropic components or being easily convertible into optically anisotropic matter under stress or heat, which pitch is usually used to produce a carbon fiber.

Examples of the pitch easily convertible into optically anisotropic matter under stress or heat include a variety of optically isotropic pitchs comprising components easily convertible into optically anisotropic matter which are collected through extraction of heavy oil or pitch, or obtained through reduction of optically anisotropic pitch into optically isotropic pitch easily convertible into optically anisotropic matter.

Methods of melt-spinning optically anisotropic pitch to produce a pitch fiber include a spun bonding method wherein pitch is spun from a common spinneret and drawn with the aid of a gaseous stream or a roller; a melt blowing method wherein pitch is spun from spinning orifices or slits having respective pitch outlets in a high-speed gaseous stream (air, steam, combustion waste gas, or the like) and drawn into fine fibers with the aid of the high-speed gaseous stream; and a centrifugal spinning method wherein pitch in a pot or a dish being revolved at a high speed is sprayed into fine liquid pitch streams by the centrifugal force thereof to form a fiberous material therefrom. For production of a mat-like material, the melt bowing method is preferable from the viewpoint of cost and quality.

The infusiblized fiber of optically anisotropic pitch that may be used in the present invention is a fiber produced by heat-treating a fiber, melt-spun from optically anisotropic spinning pitch, in an oxidative atmosphere at relatively low temperatures including a maximum temperature of 200° to 400° C. according to a customary method to render the melt-spun fiber infusible for the purpose of preventing the fiber from undergoing interfiber fusion bonding.

The infusiblized and slightly carbonized fiber of optically anisotropic pitch that may be used in the present invention is a fiber produced by heating the infusibilized fiber of optically anisotropic pitch up to at most 1,000° C., preferably at most 800° C., at a heat-up rate of 10° to 100° C./min in an atmosphere of an inert gas according to a customary method to slightly carbonize the infusiblized fiber for the purpose of improving the strength thereof so as to make the fiber well adapted for handling thereof in the piling-up, entanglement and carbonization steps involved in the process of the present invention.

The sheets to be used in the present invention may be in the form of a mat, a woven fabric, a knitted fabric, a non-woven fabric, a paper-like material, an arrangement of fiber bundles such as slivers, or any other arbitrary fibrous sheet such as a fibrous flat material represented by a random web without any particular restrictions. Especially preferred are mats formed directly in association with the melt spinning step. For example, mats formed by the melt blowing method can be conveniently used.

The infusiblization treatment, or infusiblization and slight carbonation treatments of an optically anisotropic pitch fiber may be done either immediately after a melt-spun pitch fiber is transferred to a fiber-collecting unit, or after the melt-spun pitch fiber is formed either into a cotton-like material through appropriate cutting or into a non-woven fabric through interfiber self-adhesion and/or entanglement.

Since the optically anisotropic pitch fiber before the infusiblization treatment thereof is so very weak as to be often incapable of resisting the processing thereof to form it into a configuration corresponding to the fiber structure, it is necessary to use the infusiblized, or infusiblized and slightly carbonized fiber of optically anisotropic pitch for formation of fiber into a configuration corresponding to the fiber structure.

The slight carbonization temperature may be arbitrarily set in accordance with the characteristics, such as strength and elongation, of the optically anisotropic fiber to be used. However, the slight carbonization temperature is preferably at most about 800° C. to ensure as much as possible that it can avoid being substantially the same as the carbonization temperature to be used in the latter step involved in the process of the present invention.

Any phenolic resin fiber of arbitrary choice such as a novolak fiber can be used in the present invention. However, it is preferable to use a phenolic resin fiber which is great in both elongation and shrinkage during heat treatment for carbonization thereof (when compared to the pitch-derived fiber) and is capable of having a high purity of carbon after carbonization thereof, examples of which fiber include Kynol (trade name of a product manufactured by Gun-ei Chemical Industry Co., Ltd.).

A phenolic resin fiber having a small elongation is not preferable because it may be so ineffective in improving the processability of the infusiblized, or infusiblized and slightly carbonized fiber of optically anisotropic pitch when formed into the configuration corresponding to the carbon fiber structure that damage to the carbon fiber structure may be increased.

A specific description will now be made of the processes for producing a carbon fiber structure or a carbon-carbon composite material according to the present invention.

In the process (1) of the present invention, the infusiblized, or infusiblized and slightly carbonized fiber of optically anisotropic pitch may be blended with the phenolic resin fiber by a customary method such as blending of staple fibers formed from the two kinds of fibers or blending through carding of mat-like materials formed from the two kinds of fibers.

The blending proportion of the infusiblized, or infusiblized and slightly carbonized fiber of optically anisotropic pitch relative to the blend thereof with the phenolic resin fiber may be arbitrarily set in accordance with the characteristics, such as bulk density, required of the carbon fiber structure to be produced according to the present invention. In order to make the most of the advantages, such as large elongation and large shrinkage, of the phenolic resin fiber as well as the advantages, such as high strength and high modulus of elasticity, of the infusiblized, or infusiblized and slightly carbonized fiber of optically anisotropic pitch, however, it is preferable that the blending proportion of the infusiblized, or infusiblized and slightly carbonized fiber of optically anisotropic pitch type relative to the blend thereof with the phenolic resin fiber be about 60 to 90 wt. % and the blending proportion of the phenolic resin fiber relative to the abovementioned blend be about 10 to 40 wt. % accordingly.

When the blending proportion of the phenolic resin fiber relative to the blend is less than about 10 wt. %, the advantageous physical properties, such as large elengation and large shrinkage, of the phenolic resin fiber may not be manifested satisfactorily. When it exceeds about 40 wt. %, the advantageous physical properties, such as high strength and high modulus of elasticity, of the infusibilized, or infusibilized and slightly carbonized fiber of optically anisotropic pitch tends not to be manifested satisfactorily.

The foregoing description in connection with the process (1) of the present invention can substantially apply to the processes (2) and (3) of the present invention if some points thereof are read in such a changed context as to be adapted for the latter processes.

The sheets of such fiber material are piled up and entangled with each other before the carbonization treatment thereof.

The sheets may be piled up by a customary method such as hand lay-up of an appropriate number of sheets in a predetermined position.

The entanglement of the piled-up sheets with each other may be done by any one of various methods, examples of which include needle punching, entanglement using a jet of water stream, collision of a fluid, such as water, containing a fiber suspended therein against piled-up sheets, and combinations thereof.

Since the carbon fiber structure of the present invention is generally used in the form of a thick sheet in most cases, the needle punching method capable of entangling thick sheets of fiber with each other up to a considerable depth thereof provides good results, as compared with the methods of entanglement using a fluid which are capable of efficiently entangling thin sheets of fiber with each other.

The resulting fiber laminate of entangled sheets is carbonized in an atmosphere of an inert gas at a temperature of at least about 800° C. according to a customary method. The carbonization temperature may be arbitrarily set in accordance with the characteristices, such as strength and modulus of elasticity, required of the carbon fiber structure to be produced according to the present invention.

The phenolic resin fiber is characterized by a shrinkage of about 25% when heat-treated at a temperature of at least 800° C. for carbonization thereof.

When the sheets of the infusiblized, or infusiblized and slightly carbonized fiber of optically anisotropic pitch blended with the phenolic resin fiber is piled up, entangled with each other and heat-treated to be carbonized according to the process (1) of the present invention, the shrinking effect of the phenolic resin fiber increases the bulk density of the resulting carbon fiber structure as against the bulk density of a carbon fiber structure produced from only the infusiblized, or infusiblized and slightly carbonized fiber of optically anisotropic pitch type, while enhancing the effect of entanglement to increase the fiber-holding power of the carbon fiber structure. This improves the abrasion resistance and vibration resistance of the carbon fiber structure. The same is true of the processes (2) and (3) of the present invention.

In the process (3) of the present invention, examples of the precursor of carbon usable for impregnation therewith of the fiber laminate include easily carbonizable petroleum pitch, coal pitch and thermosetting resins, which are commonlly used to produce carbon-carbon composite materials.

The fiber laminate is impregnated with a liquid carbonizable substance such as a resin or a pitch, which is the precursor of matrix carbon, under reduced pressure, under increased pressure, or under reduced and subsequently increased pressures or vice versa. The impregnation may be followed by press molding if necessary.

The extent of the impregnation may be appropriately chosen in accordance with the desired physical properties, such as flexural strength and bulk density, of the carbon-carbon composite material to be produced according to the present invention.

Subsequently, the impregnated fiber laminate is carbonized and, if necessary, graphitized in an atmosphere of an inert gas under atmospheric or increased pressure to form the carbon-carbon composite material endowed with necessary physical properties (strength, bulk density, etc.).

As described hereinbefore, large shrinkage of the phenolic resin fiber during the course of carbonization treatment increases the bulk density of the carbon fiber structure according to the present invention. In the same context, the fiber laminate impregnated with the precursor of carbon, when carbonized, can be formed into the carbon-carbon composite material endowed with a high volume fiber content and a high flexural strength. The same is true of the case where the carbon fiber structure produced according to the process (1) or (2) of the present invention is impregnated with a precursor of carbon and subjected to further carbonization.

Additionally stated, the fibers to be used in the present invention usually have an average filament diameter which is in the range of 1 $\mu$m to 50 $\mu$m, while the total number of sheets thereof to be entangled with each other in the present invention is preferably 2 to 150, more preferably 8 to 110.

The carbon fiber structure of the present invention, which is constituted of the sheets of carbon fiber tightly entangled with each other, exhibits an excellent performance as a heat-insulating material that may be used particularly in an inert atmosphere at high temperatures at which radiant heat transfer predominates over convectional heat transfer and conductive heat transfer, because it is mainly constituted of the carbon fiber of optically anisotropic pitch type excellent in heat resistance and is mixed with very little amounts of components other than carbon. Accordingly, the carbon fiber structure of the present invention can be used as a heat-insulating material that may be provided just outside of the body of an electric furnace or in contact with the high temperature part of a nuclear reactor.

The carbon fiber structure of the present invention can also be suitably used as a filter medium particularly in a non-oxidizing but high-temperature atmosphere or in a relatively low-temperature but severely corrosive atmosphere.

The high bulk density carbon fiber structure of the present invention, when impregnated with an easily carbonizable substance and subjected to further carbonization, can be formed into a carbon-carbon composite material with a high volume fiber content.

The advantages of the present invention will be summarized as follows.

A laminate of carbon fiber sheets can be produced by piling up sheets of a carbon fiber and bonding the sheets to each other. When sheets of a carbon fiber of pitch type is bonded to each other through entanglement, however, damage to the carbon fiber is often caused and the efficiency of entanglement is poor because the carbon fiber of pitch type is small in elongation. By contrast, according to the present invention, the large elongation and shrinkage of the phenolic resin fiber is made the most of in the production of the carbon fiber structure constituted mainly of the carbon fiber of optically anisotropic pitch type to achieve improvements in handleability of fiber sheets and stability of a laminate structure formed through entanglement of fiber sheets without any substantial decrease in purity of carbon in the carbon fiber structure.

The shrinking action of the phenolic resin fiber during heat treatment for carbonization makes the resulting carbon fiber structure high in bulk density. This is translated into an increase in volume fiber content in the case of a carbon-carbon composite material produced either by the process (3) of the present invention or by impregnating the carbon fiber structure of the present invention with a precursor of carbon and subjecting the impregnated structure to further carbonization.

BEST MODES FOR CARRYING OUT THE INVENTION

The following Examples will now specifically illustrate the present invention in more detail, but should not be construed as limiting the scope of the invention.

EXAMPLE 1

Petroleum pitch having a softening point of 275° C. and an optically anisotropic components content of 95 wt. %, as a starting material, was spun by the centrifugal spinning method, heat-treated by a customary method to be rendered infusible, and slightly carbonized by a customary method (maximum temperature: 700° C.) to produce mat-like sheets of an infusiblized and slightly carbonized fiber of optically anisotropic pitch having a unit weight of 120 g/m$^2$ and a thickness of 5 mm.

Using six mat-like sheets of the pitch type fiber thus produced and four felt sheets (unit weight: 100 g/m$^2$) of a phenolic resin fiber (Kynol manufactured by Gun-ei Chemical Industry Co., Ltd.) with the total number of sheets being 10, three sets each of two mat-like sheets of the pitch type fiber were piled up altenatively with the four felt sheets of the phenolic resin fiber in such a way as to position two felt sheets of the phenolic resin fiber on the respective two sides of the resulting assembly of the sheets, followed by entanglement of the sheets with each other through needle punching at a punching density of 35 times/cm.$^2$ The resulting fiber laminate was carbonized in an inert gas at high temperatures including a maximum temperature of 1,600° C. The resulting carbon fiber structure, which underwent no inter-sheet debonding and was in a tightly entangled state, had a bulk density of 0.13 g/cc and showed excellent heat-insulating properties at high temperatures.

Substantially the same procedure as described above except that cloth sheets (unit weight: 190 g/m$^2$) of the phenolic resin fiber (Kynol manufactured by Gun-ei Chemical Industry Co., Ltd.) were used instead of the felt sheets of the phenolic resin fiber was repeated to produce a carbon fiber structure having a performance comparable to that of the carbon fiber structure produced first.

Additionally stated, when the same phenolic resin fiber as used in the above-mentioned felt sheets and cloth sheets was carbonized by heating in an inert gas up to 900° C. at a heat-up rate of 5° C./min, the shrinkage of the fiber was 24%.

EXAMPLE 2 AND COMPARATIVE EXAMPLE 1

Petroleum pitch having a softening point of 284° C. and an optically anisotropic components content of 100 wt. %, as a starting material, was spun by the melt blowing method, heat-treated by a customary method to be rendered infusible, and slightly carbonized by a customary method (maximum temperature: 600° C.) to produce a mat-like material of an infusiblized and slightly carbonized fiber of optically anisotropic pitch type having a unit weight of 120 g/m.$^2$ In carding the mat-like material of the pitch type fiber thus produced and a mat-like material (unit weight: 200 g/m$^2$) of a phenolic resin fiber (Kynol manufactured by Gun-ei Chemical Industry Co., Ltd.), 85 wt. % of the infusiblized and slightly carbonized fiber of optically anisotropic pitch type was blended with 15 wt. % of the phenolic resin fiber to form card webs, ten of which were then entangled with each other through needle punching at a punching density of 35 times/cm.$^2$ The resulting fiber laminate was carbonized in an inert gas at high temperatures including a maximum temperature of 2,000° C. The resulting carbon fiber structure, which underwent no inter-web debonding and was in a tightly entangled state, had a bulk density of 0.16 g/cc and showed excellent heat-insulating properties at high temperatures.

Substantially the same procedure as described above except that the infusiblized and slightly carbonized fiber of optically anisotropic pitch type alone was used in carding was repeated to produce a carbon fiber structure having a bulk density of 0.048 g/cc. During the course of the carbonization treatment, a liability to inter-web debonding was observed by sight.

EXAMPLE 3 AND COMPARATIVE EXAMPLE 2

Petroleum pitch having a softening point of 284° C. and an optically anisotropic components content of 100 wt. % was spun out of a common-type spinneret for melt spinning and sucked into an aspirator to be formed into a fiber, which was then collected on a net conveyor, heat-treated by a customary method to be rendered infusible, and slightly carbonized by a customary method (maximum temperature: 600° C.) to produce sheets of an infusiblized and slightly carbonized fiber of optically anisotropic pitch having a unit weight of 120 g/m.$^2$ The sheets of the pitch fiber thus produced were piled up and entangled with each other. The resulting fiber laminate was impregnated with petroleum pitch having a softening point of 147° C. by a customary method, followed by carbonization thereof at high temperatures including a maximum temperature of 1,000° C.

The resulting carbon-carbon composite material had a volume fiber content of 2.5 wt. % and a flexural strength of 3.9 kg/mm$^2$ as measured according to JIS K6911.

The same sheets of the pitch fiber as used in the foregoing procedure was used together with the same phenolic resin fiber as used in Example 2 to form blended card webs in the same manner as in Example 2. 50 card webs thus formed were piled up and then entangled with each other through needle punching at punching density of 40 times/cm.$^2$ The resulting fiber laminate was impregnated with the same petroleum pitch as used in the foregoing procedure, followed by carbonization thereof at high temperatures including a maximum temperature of 1,000° C.

The resulting carbon-carbon composite material had a volume fiber content of 7.2 wt. % and a flexural strength of 5.6 kg/mm$^2$ as measured according to JIS K6911. This flexural strength was a great improvement over that of the carbon-carbon composite material produced using the fiber laminate of the infusiblized and slightly carbonized fiber of optically anisotropic pitch alone.

What is claimed is:

1. A process for producing a high bulk density carbon fiber structure, comprising the step of piling up sheets of an infusiblized, or infusiblized and slightly carbonized fiber of optically anisotropic pitch mixed with a phenolic resin fiber having elongation and shrinkage during heat treatment for carbonization thereof greater than that of said optically anisotropic pitch fiber, with the mixing proportion of said phenolic resin fiber of 10 to 40 wt. % relative to the mixture, the step of entangling the piled-up sheets with each other to form a fiber laminate, and the step of carbonizing said fiber laminate at a temperature of at least 800° C.

2. A process for producing a high bulk density carbon fiber structure, comprising the step of piling up one or more sheets of an infusibilized, or infusibilized and slightly carbonized fiber of optically anisotropic pitch together with one or more sheets of a phenolic resin fiber having an elongation and shrinkage during heat treatment at carbonizing temperatures greater than those of said optically anisotropic pitch fiber, or sheets of an optically anisotropic pitch fiber mixed with said phenolic resin fiber with a mixing proportion of said phenolic resin fiber of 10 to 40 wt. % relative to the mixture, the step of entangling the piled-up sheets with each other to form a fiber laminate, and the step of carbonizing said fiber laminate at a temperature of at least 800° C.

3. A process for producing a carbon-carbon composite material with a high volume fiber content, comprising the step of piling up sheets of an infusibilized, or infusibilized and slightly carbonized fiber of optically anisotropic pitch mixed with a phenolic resin fiber having an elongation and shrinkage during heat treatment at carbonizing temperatures greater than those of said optically anisotropic pitch fiber with the mixing proportion of said phenolic resin fiber of 10 to 40% relative to the mixture, the step of entangling the piled-up sheets with each other to form a fiber laminate, the step of impregnating said fiber laminate with a precursor of carbon, and the step of carbonizing the impregnated fiber laminate at a temperature of at least 800° C.

4. A high bulk density carbonized carbon fiber structure, comprising piled up sheets of an infusibilized, or infusibilized and slightly carbonized fiber of optically anisotropic pitch mixed with a phenolic resin fiber having elongation and shrinkage during heat treatment for carbonization thereof greater than that of said optically anisotropic pitch fiber, with the mixing proportion of said phenolic resin fiber of 10 to 40 wt. % relative to the mixture.

5. A high bulk density carbonized carbon fiber structure, comprising piled up sheets of an infusibilized, or infusibilized and slightly carbonized fiber of optically anisotropic pitch together with one or more sheets of a phenolic resin fiber having an elongation and shrinkage during heat treatment at carbonizing temperatures greater than those of said optically anisotropic pitch fiber, or sheets of an optically anisotropic pitch fiber mixed with said phenolic resin fiber with a mixing proportion of said phenolic resin fiber of 10 to 40 wt. % relative to the mixture.

6. A carbon-carbon composite material comprising piled up sheets of an infusibilized, or infusibilized an slightly carbonized fiber or optically anisotropic pitch mixed with a phenolic resin fiber having an elongation and shrinkage during heat treatment at carbonizing temperatures greater than those of said optically anisotropic pitch fiber with mixing proportion of said phenolic resin fiber of 10 to 40% relative to the mixture, and a carbonizable impregnant.

* * * * *